| (12) United States Patent<br>Sturgin et al. | (10) Patent No.: US 7,757,828 B2<br>(45) Date of Patent: Jul. 20, 2010 |
|---|---|

(54) CLUTCH ATTACHED TO AN OUTER RIM OF A TORQUE CONVERTER

(75) Inventors: Todd Sturgin, Shreve, OH (US); Scott Schrader, Canton, OH (US); Marc McGrath, Strasburg, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 536 days.

(21) Appl. No.: 11/637,326

(22) Filed: Dec. 12, 2006

(65) Prior Publication Data

US 2007/0137962 A1 Jun. 21, 2007

Related U.S. Application Data

(60) Provisional application No. 60/752,162, filed on Dec. 20, 2005.

(51) Int. Cl.
 *F16H 45/02* (2006.01)
(52) U.S. Cl. .................... 192/3.29; 192/70.18
(58) Field of Classification Search ........................ None
 See application file for complete search history.

(56) References Cited

U.S. PATENT DOCUMENTS 4,174,559 A 11/1979 Persik et al.

| 4,353,444 | A | * | 10/1982 | Bionaz ........................ 192/3.29 |
| 6,142,272 | A | | 11/2000 | Meisner et al. |
| 6,193,037 | B1 | | 2/2001 | Middelmann et al. |
| 6,688,441 | B1 | | 2/2004 | Arhab et al. |
| 6,926,131 | B1 | | 8/2005 | Arhab et al. |
| 2009/0078522 | A1 | * | 3/2009 | Jung et al. .................. 192/3.29 |

* cited by examiner

*Primary Examiner*—Richard M. Lorence
(74) *Attorney, Agent, or Firm*—Simpson & Simpson, PLLC (57) ABSTRACT

The present invention broadly comprises a torque transfer apparatus for a torque converter including at least one connection element attached to an inner circumferential surface for a cover of the converter; a lock-up clutch, and at least one resilient element connected to the connection element and the piston plate. The clutch includes a piston plate with extruded rivets and the resilient element is connected to the piston plate with the extruded rivets. In some aspects, the clutch includes a friction material having inner and outer radii and the extruded rivets are disposed at a radial distance greater than the inner radius; the extruded rivets are disposed between the inner and outer radii; a radial segment for the connection element extends radially from the inner surface and has an edge at a greater radial distance than the inner radius; or the resilient element is between the inner and outer radii.

12 Claims, 10 Drawing Sheets

Prior Art

CLUTCH ATTACHED TO AN OUTER RIM OF A TORQUE CONVERTER

CROSS-REFERENCE TO RELATED APPLICATIONS

This application claims the benefit under 35 U.S.C. §119(e) of U.S. Provisional Application No. 60/752,162 filed Dec. 20, 2005.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a torque converter clutch connected to a rim of a torque converter cover or torque converter pump cover to increase the radius of the friction material for the clutch. The invention also relates to a method for installing a clutch in a torque converter.

BACKGROUND OF THE INVENTION

Figure 1:
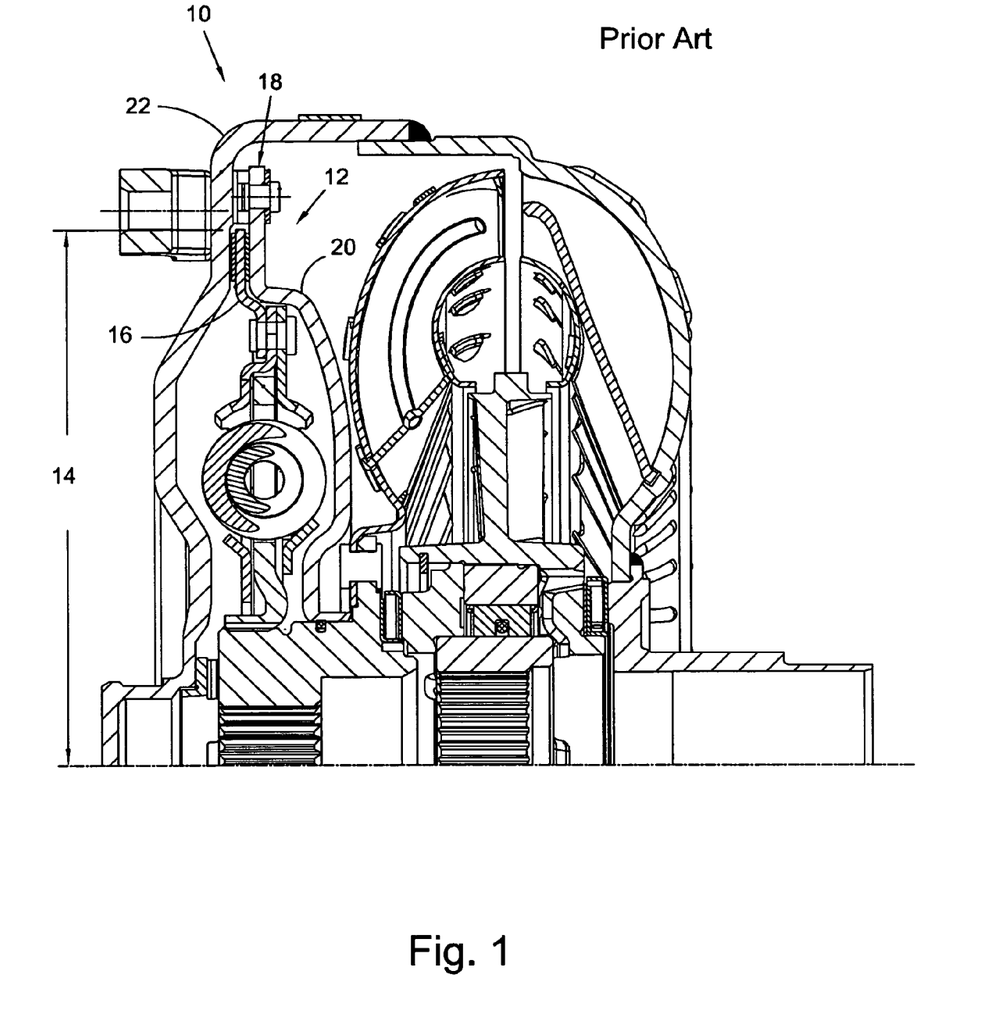
FIG. 1 is a partial cross-sectional view of a prior art torque converter.

FIG. 1 is a partial cross-sectional view of prior art torque converter 10. The amount of torque that can be transferred by a torque converter in lock-up mode is dependent upon the size of the lock-up clutch. In particular, the torque capacity is a function of the active radius of friction material for the clutch plate(s). Specifically, increasing the friction material radius increases the torque capacity. For example, for lock-up clutch 12, increasing radius 14 increases the torque capacity of clutch 12. Unfortunately, the radial extent of clutch plate 16, and hence radius 14, is restricted due to the configuration of components in converter 10. For example, connection 18 of piston 20 to cover 22 limits the radial extension of plate 16. That is, radius 14 cannot be increased because of the presence of connection 18 and the torque capacity of clutch 12 is subsequently limited.

Thus, there is a long-felt need for a torque converter with increased torque capacity. In particular, there is a long-felt need for a lock-up clutch, with a larger radius clutch plate, in a torque converter.

BRIEF SUMMARY OF THE INVENTION

The present invention broadly comprises a torque transfer apparatus for a torque converter including at least one connection element attached to an inner circumferential surface for a cover of the torque converter, a lock-up clutch, and at least one resilient element connected to the at least one connection element and a piston plate for the lock-up clutch. The piston plate has a plurality of extruded rivets and the resilient element is connected to the piston plate with the plurality of extruded rivets. The lock-up clutch includes a friction material having an inner radius and an outer radius. In some aspects, the plurality of extruded rivets is disposed at a radial distance from an axis for the converter, and the radial distance is greater than the inner radius. In some aspects, the radial distance is between the inner and outer radii. In some aspects, the connection element includes a radial segment extending radially from the inner circumferential surface and with an edge disposed a radial distance from the axis and the radial distance is greater than the inner radius for the friction material. In some aspects, the at least one resilient element is disposed between the inner and outer radii for the friction material.

The present invention also broadly comprises a torque transfer apparatus for a torque converter including at least one connection element and a piston plate for a lock-up clutch. The at least one connection element is connected to the piston plate and the at least one connection element is fixedly secured to a cover for the torque converter with a force-fit between the at least one connection element and the cover. The cover includes an inner circumferential surface and the force fit is between the at least one connection element and the inner radial surface. In some aspects, the inner circumferential surface and the at least one connection element include at least one recess and at least one protrusion and the force-fit includes the protrusion and recess. In some aspects, the recess and the protrusion are circumferentially disposed about an axis for the torque converter. In some aspects, the protrusion is formed in the inner circumferential surface and the recess is formed in the connection element. In some aspects, the cover is dimpled into the connection element. In some aspects, the protrusion extends circumferentially along the inner circumferential surface.

The present invention further broadly comprises a torque transfer apparatus for a torque converter including at least one connection element attached to an inner radial surface for a pump cover and a lock-up clutch connected to the at least one connection element.

The present invention broadly comprises a method for assembling a torque converter including: stacking a pump for the torque converter; attaching a connection element to an inside circumferential surface of the pump cover; stacking a reactor on the pump; and, stacking a turbine on the reactor. In some aspects, attaching includes welding the connection element. In some aspects, the torque converter includes a component disposed between a turbine cover and the cover for the torque converter and the method includes connecting the component to the connection element. In some aspects, the component is a lock-up clutch.

The present invention also broadly comprises a method for installing a lock-up clutch in a torque converter including: stacking a pump for the torque converter; attaching a connection element to an inside circumferential surface of the pump cover; stacking a reactor on the pump; stacking a turbine on the reactor; bending the connection element to form a segment extending radially inward; and connecting the lock-up clutch to the segment. In some aspects, attaching includes welding the connection element. In some aspects, the lock-up clutch includes an axially displaceable plate and connecting the lock-up clutch includes connecting the plate and the segment.

It is a general object of the present invention to provide a torque converter with an increased torque capacity while in lock-up mode.

It is another object of the present invention to provide a torque converter with a lock-up clutch having a larger radius for friction material.

It is yet another object of the present invention to provide a torque converter with a larger radius resilient element for a lock-up clutch.

It is a further object of the present invention to provide a torque converter with a lock-up clutch engaged to a pump cover for the torque converter.

It is yet a further object of the present invention to provide a method for stacking a torque converter.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 12A is a perspective view of a cylindrical coordinate system demonstrating spatial terminology used in the present application; and, FIG. 12B is a perspective view of an object in the cylindrical coordinate system of FIG. 12A demonstrating spatial terminology used in the present application.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figures 12A, 12B:
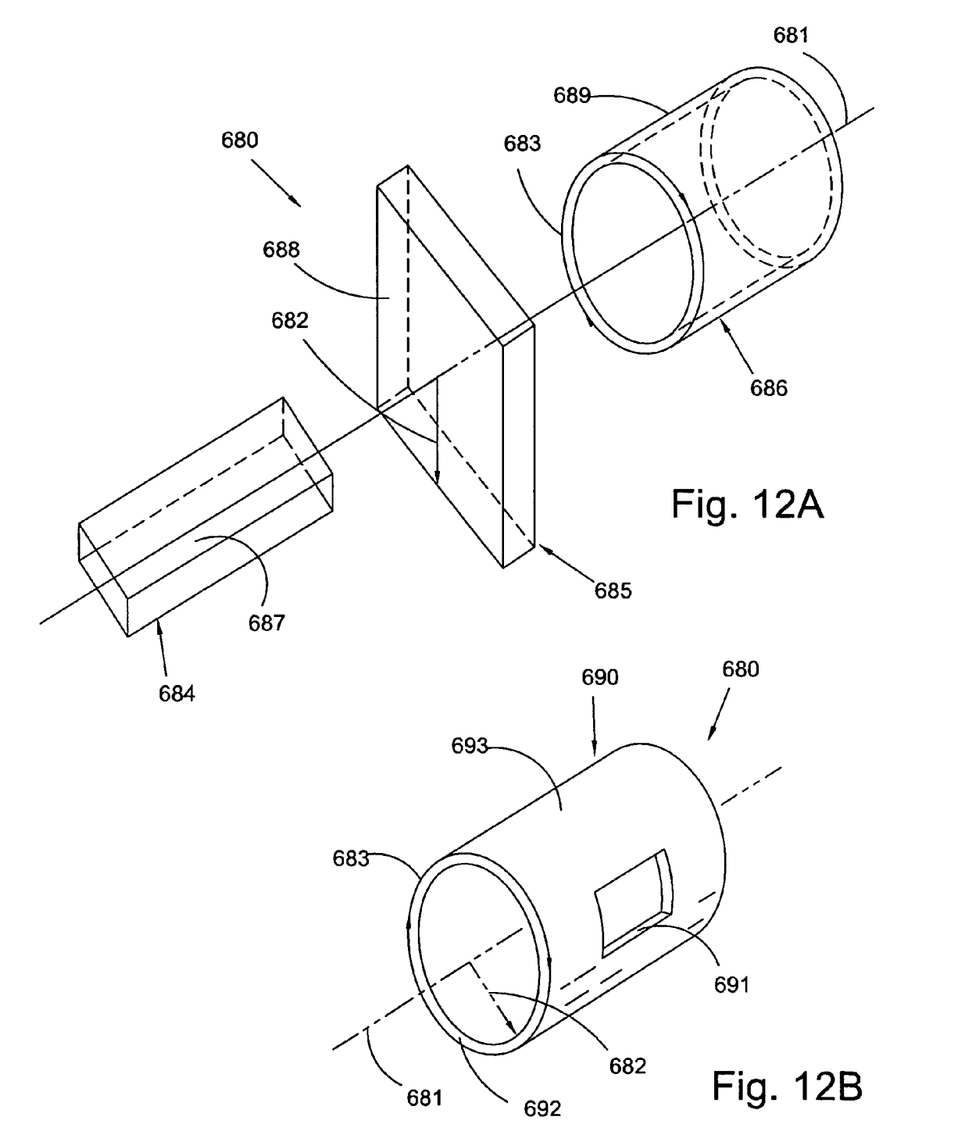

FIG. 12A is a perspective view of cylindrical coordinate system 680 demonstrating spatial terminology used in the present application. The present invention is at least partially described within the context of a cylindrical coordinate system. System 680 has a longitudinal axis 681, used as the reference for the directional and spatial terms that follow. The adjectives "axial," "radial," and "circumferential" are with respect to an orientation parallel to axis 681, radius 682 (which is orthogonal to axis 681), and circumference 683, respectively. The adjectives "axial," "radial" and "circumferential" also are regarding orientation parallel to respective planes. To clarify the disposition of the various planes, objects 684, 685, and 686 are used. Surface 687 of object 684 forms an axial plane. That is, axis 681 forms a line along the surface. Surface 688 of object 685 forms a radial plane. That is, radius 682 forms a line along the surface. Surface 689 of object 686 forms a circumferential plane. That is, circumference 683 forms a line along the surface. As a further example, axial movement or disposition is parallel to axis 681, radial movement or disposition is parallel to radius 682, and circumferential movement or disposition is parallel to circumference 683. Rotation is with respect to axis 681.

The adverbs "axially," "radially," and "circumferentially" are with respect to an orientation parallel to axis 681, radius 682, or circumference 683, respectively. The adverbs "axially," "radially," and "circumferentially" also are regarding orientation parallel to respective planes.

FIG. 12B is a perspective view of object 690 in cylindrical coordinate system 680 of FIG. 12A demonstrating spatial terminology used in the present application. Cylindrical object 690 is representative of a cylindrical object in a cylindrical coordinate system and is not intended to limit the present invention is any manner. Object 690 includes axial surface 691, radial surface 692, and circumferential surface 693. Surface 691 is part of an axial plane, surface 692 is part of a radial plane, and surface 693 is part of a circumferential plane.

Figure 2A:
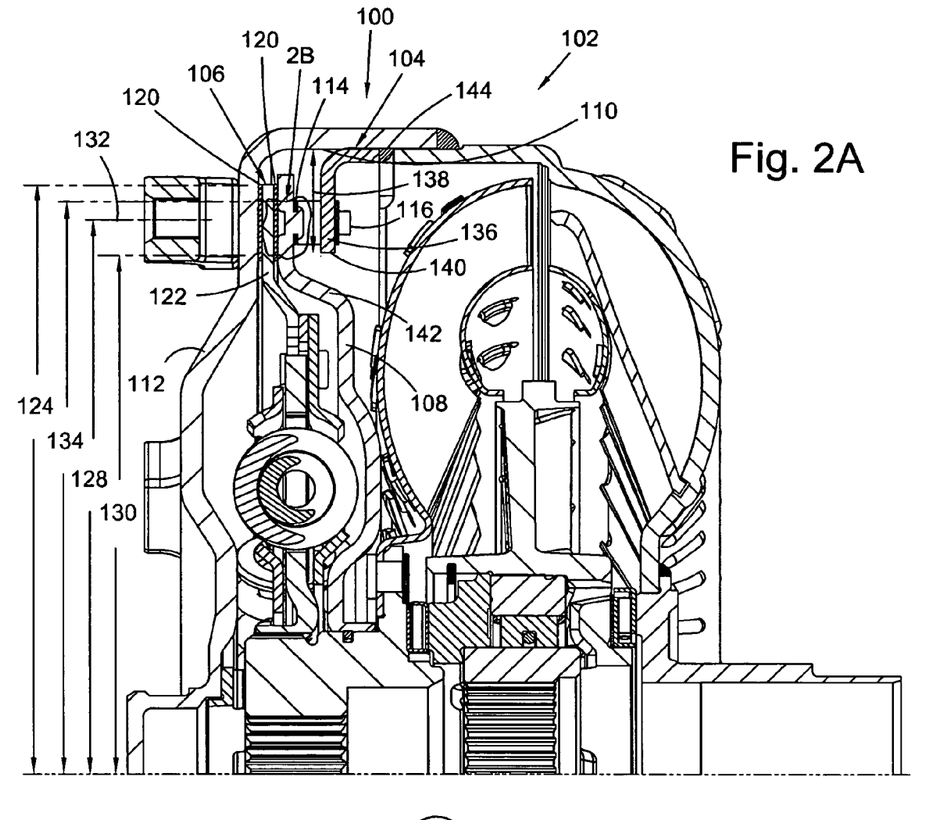
FIG. 2A is a partial cross-sectional view of a first present invention torque transfer apparatus for a torque converter.

FIG. 2A is a partial cross-sectional view of present invention torque transfer apparatus 100 for torque converter 102.

Figure 2B:
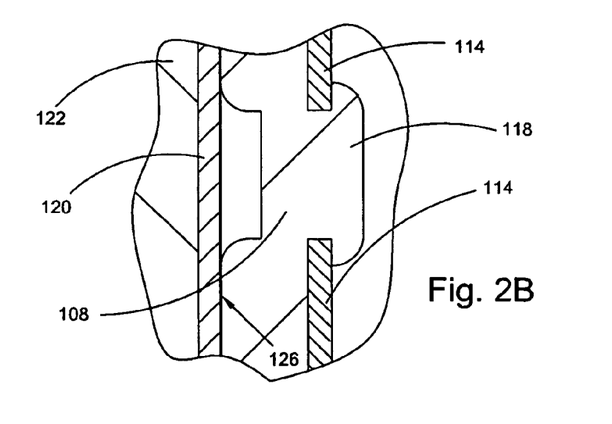
FIG. 2B is a further cross-sectional view of area 2B in FIG. 2A.

FIG. 2B is a further cross-sectional view of area 2B in FIG. 2A. The following should be viewed in light of FIGS. 2A and 2B. Apparatus 100 includes connection element 104 and lock-up clutch 106 with piston plate 108. It should be understood that the present invention is not limited to use with the clutch shown in FIG. 2A and that the present invention can be used with any lock-up clutch for a torque converter known in the art. Element 104 is attached to inner circumferential surface 110 of cover 112. Resilient element 114 is disposed between element 104 and piston 108 and is connected to each. In some aspects, element 114 is a leaf spring. However, it should be understood that element 114 can be any applicable resilient element known in the art. In some aspects, rivets 116 connect element 104 to the resilient element and extruded rivets 118 connect piston 108 to the resilient element. Rivets 118 are formed by punching or otherwise operating on piston 108. Since rivets 118 are integral to piston 108, the number of parts needed to assemble the apparatus, specifically, clutch 106, is reduced. For example, the extruded rivets take the place of separate rivets. Further, fabrication and assembly of the clutch is simplified, since the steps of inserting and holding separate rivets between element 104 and the resilient element are eliminated. Friction material 120 is disposed between clutch plate 122 and cover 112 and piston 108. The material can be secured to one or the other of plate 122 and cover 112 and to one or the other of plate 122 and piston 108, respectively.

The use of extruded rivets 118 results in a number of advantageous configurations for apparatus 100. Rivets 118 enable a larger outer radius 124 for the friction material, increasing the torque capacity for clutch 106. Specifically, since rivets 118 are extruded from piston 108, the rivets do not extend past surface 126 of piston 108. That is, the rivets do not interfere with the interface of friction material 120 with surface 126. Therefore, friction material 120 is extended such that radius 124 desirably extends beyond radial distance 128 for rivets 118. Alternately stated, rivets 118 can be disposed in axial alignment with the friction material without interfering with the function of the clutch and the disposition of the friction material is made independent of the connection of piston 108 with element 114. For example, rivets 118 are radially disposed between inner radius 130 and outer radius 124 for friction materials 120. That is, a radius of resilient element 114, coinciding with radial distance 128, is aligned with center line 132 of rivets 116 and 118. If separate rivets (not shown) were used to secure element 114 to piston 108, the rivet heads would extend past the surface of the piston, for example, surface 126, interfering with the friction material interface. Therefore, the outer radius of the friction material would need to be less than the radial distance to the rivets, thus undesirably limiting the outer radius and subsequently, the torque capacity of the lock-up clutch.

Rivets 118 also provide advantages regarding resilient element 114. Specifically, the rivets enable the use of a resilient element having a larger outer radius 134. For example, as noted supra, rivets 118, which are aligned with element 114, can be disposed in axial alignment with the friction material without interfering with the function of the clutch. Therefore, the disposition of element 114 is freed of constraints regarding the location of fasteners for the element with respect to the friction material. Since the torque produced by resilient element 114 is the product of the force applied to the element times the radius of the element (location of the application point for the force), for example, radial distance 128, increasing the radius of element 114 advantageously reduces the amount of force needed to produce a desired torque for element 114. This reduction in force typically results in a simplification and/or a reduction in size for the apparatus supplying the force. In contrast, for some lock-up clutches using separate rivets in place of extruded rivets 118 (not shown), the rivets securing a resilient element, such as element 114, to a piston plate, such as 108, would need to be located radially inward from the inside radius of the clutch plate frictional material, such as material 120. Thus, the radius for such a resilient element would be significantly reduced.

The disposition of rivets 118 also creates advantages related to connection element 104. Since element 114 has a larger radius, segment 136 does not need to extend as far inward radially. That is, distance 138 between surface 110 and end 140 is minimized. Alternately stated, the inside radius (not shown) for segment 136 is reduced. Reducing distance 138 reduces the size and weight of element 104, which advantageously reduces the inertia and inertial losses associated with element 104. Also, reducing the size and weight of element 104 reduces the cost of the element.

The disposition of rivets 118 further creates advantages related to piston 108. As noted supra, for some lock-up clutches using separate rivets in place of extruded rivets 118, a resilient element and the rivets securing the element would need to be located radially inward from the inside radius of the clutch plate frictional material. For many such clutches the area of the piston used to secure the rivets is bent, such as shown in area 142 of piston 108. Such bending creates stresses in the material forming the piston. When holes are formed in this area, the stresses are exacerbated. Thus, cracking of the material may be caused or accentuated by forming the holes. In contrast, the area of piston 108 in which rivets 116 are installed is relatively stress-free and therefore, the cracking of piston 108 in the vicinity of rivets 116 is eliminated or greatly reduced.

Element 104 can be a single piece extending completely about an inner circumference for cover 112, for example, a ring-shaped piece, or can be a plurality of pieces located at different spots along the inner circumference. For example, portions of a ring-shaped piece. Element 104 can be attached to the cover or inner surface 110 using any means known in the art. For example, weld 144 is used to attach element 104 in FIG. 2A. The weld can be continuous or in spots. Any type of welding known in the art can be used.

Figure 3:
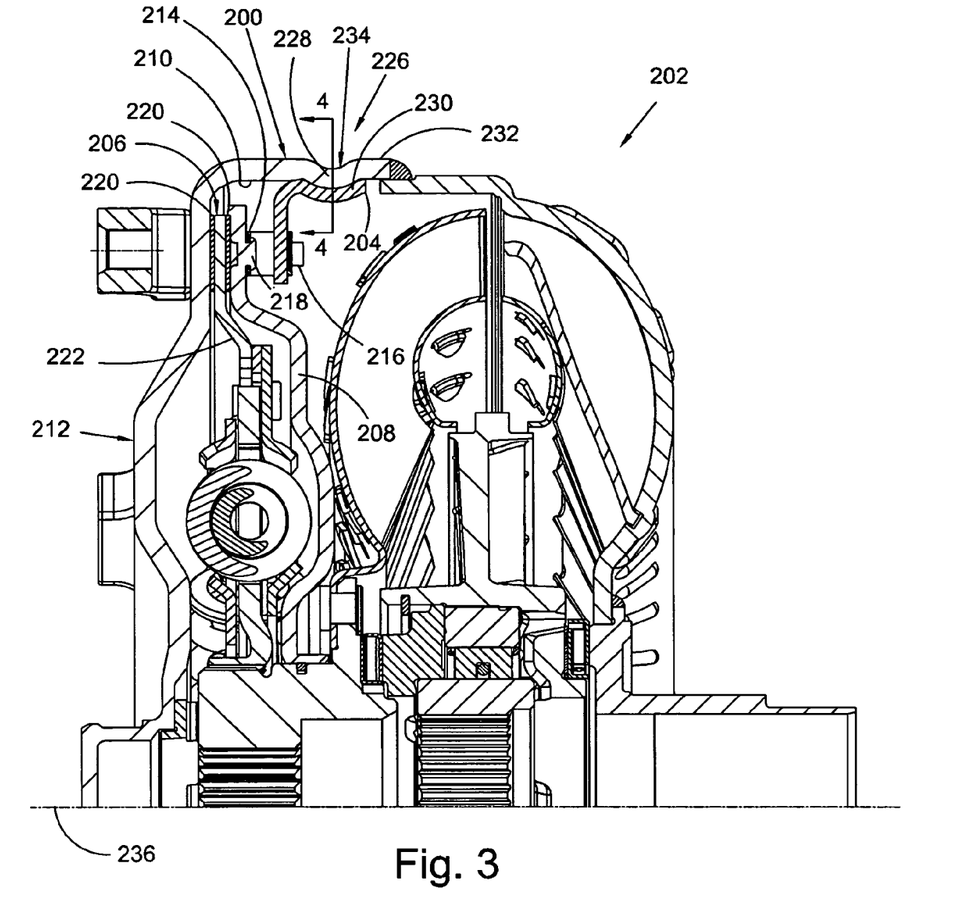
FIG. 3 is a partial cross-sectional view of a second present invention torque transfer apparatus for a torque converter.

FIG. 3 is a partial cross-sectional view of present invention torque transfer apparatus 200 for torque converter 202.

Figure 4:
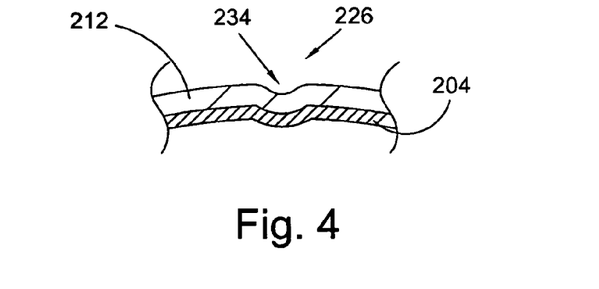
FIG. 4 is a partial cross-sectional view along line 4-4 in FIG. 3.

FIG. 4 is a partial cross-sectional view along line 4-4 in FIG. 3. The following should be viewed in light of FIGS. 1 through 4. Apparatus 200 includes connection element 204 and lock-up clutch 206 with piston plate 208. It should be understood that the present invention is not limited to use with the clutch shown in FIG. 3 and that the present invention can be used with any lock-up clutch for a torque converter known in the art. Element 204 is attached to inner circumferential surface 210 of cover 212. Resilient element 214 is disposed between element 204 and piston 208 and is connected to each. In some aspects, element 214 is a leaf spring. However, it should be understood that element 214 can be any applicable resilient element known in the art. In some aspects, rivets 216 connect element 204 to the resilient element and extruded rivets 218 connect piston 208 to the resilient element. Friction material 220 is disposed between clutch plate 222 and cover 212 and piston 208. The material can be secured to one or the other of plate 222 and cover 212 and to one or the other of plate 222 and piston 208, respectively. The discussion regarding resilient element 114, rivets 116 and 118, friction material 120, and clutch plate 122 in the descriptions for FIGS. 2A and 2B is applicable to resilient element 214, rivets 216 and 218, friction material 220, and clutch plate 222, respectively. The discussion regarding advantageous configurations for apparatus 100 in the descriptions for FIGS. 2A and 2B is applicable to apparatus 200.

Connection element 204 is fixedly secured to cover 212 of torque converter 202 with force-fit 226. By force-fit we mean that connection element 204 and cover 212, particularly surface 210, have been physically manipulated so that the element and the surface are securely connected without the use of ancillary fasteners or mechanical fastening means such as rivets or welding.

In some aspects, inner circumferential surface 210 and connection element 204 include at least one recess and at least one protrusion, respectively, and force-fit 226 is formed by the protrusion and the recess. For example, surface 210 forms protrusion 228 and element 204 forms recess 230. In some aspects, the protrusion and recess are disposed circumferentially about inner circumferential surface 210 and connection element 204. In some aspects, and as shown in FIGS. 3 and 4, force-fit 226 is formed by dimpling cover 212 and element 204. For example, connection element 204 is placed in contact with inner radial surface 210 and exterior 232 of cover 212 is dimpled. Then, force fit 226 consists of one or more dimples 234. In some aspects (not shown), the protrusion and recess extend circumferentially about inner circumferential surface 210 and connection element 204. That is, the protrusion and recess form respective circumferential rings. In some aspects, force fit 226 comprises one or more matched protrusions and recesses partially describing a circumference about axis 236. That is, the protrusion and recess form respective portions of a circumferential ring. In some aspects, force fit 226 comprises a single protrusion and recess fully describing a circumference about axis 236.

Figure 5:
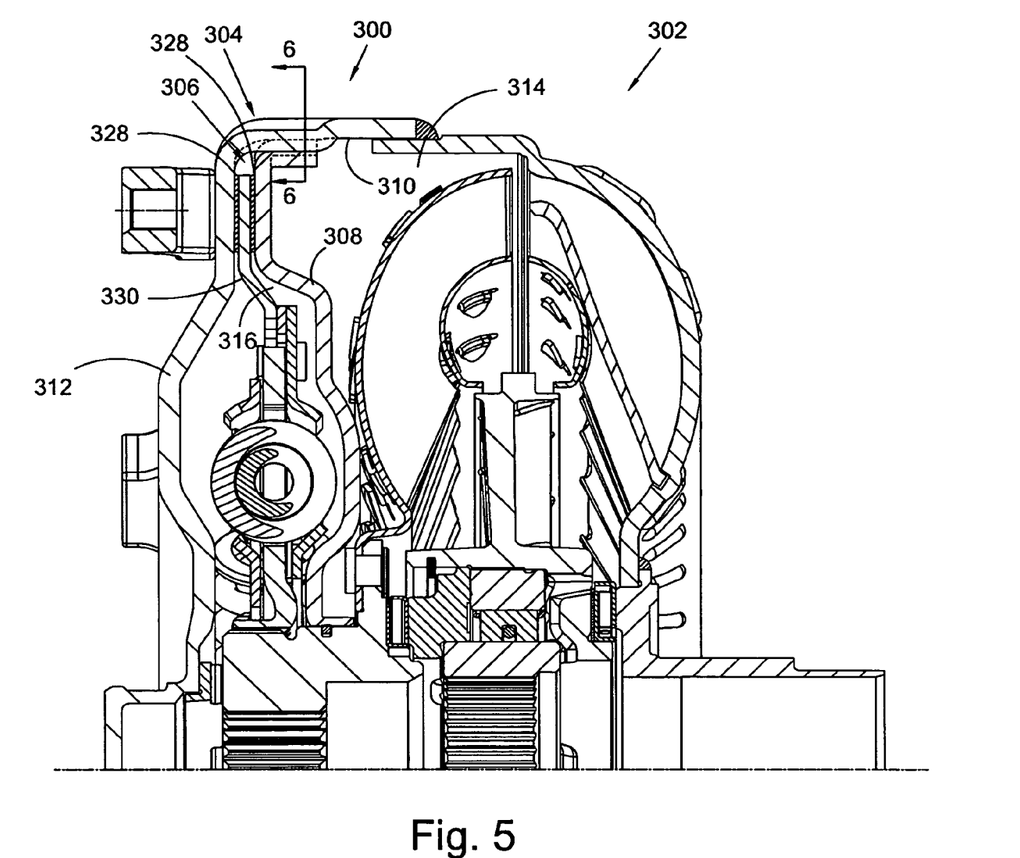
FIG. 5 is a partial cross-sectional view of a third present invention torque transfer apparatus for a torque converter.

FIG. 5 is a partial cross-sectional view of present invention torque transfer apparatus 300 for torque converter 302.

Figure 6:
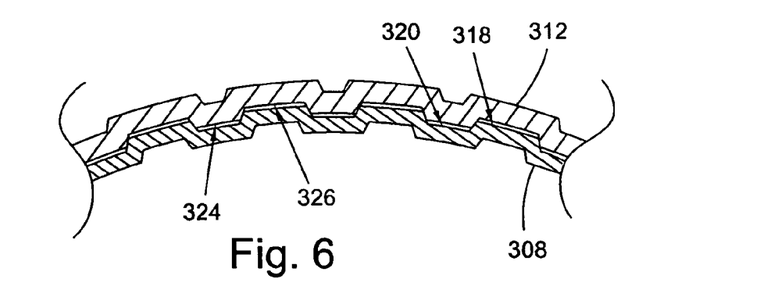
FIG. 6 is a partial cross-sectional view along line 6-6 in FIG. 5.

FIG. 6 is a partial cross-sectional view along line 6-6 in FIG. 5. The following should be viewed in light of FIGS. 1 through 6. Apparatus 300 includes connection arrangement 304 and lock-up clutch 306 with piston plate 308. It should be understood that the present invention is not limited to use with the clutch shown in FIG. 5 and that the present invention can be used with any lock-up clutch for a torque converter known in the art. Element 304 is formed between inner circumferential surface 310 of cover 312 and piston 308. Piston 308 is displaced axially by pressure changes in chambers 314 and 316. For example, increasing pressure in chamber 314 while decreasing pressure in chamber 316 moves the piston to the left in FIG. 5. The axial displacement of the piston is guided by arrangement 304. In some aspects, arrangement 304 is a splined connection. For example, piston 308 is formed with splines 318 and recesses 320 and cover 312 is formed with splines 324 and recesses 326. Splines 318 and 324 cooperatively fit with recesses 326 and 320, respectively. That is, piston 308 is able to move axially along the respective splines and notches.

Friction material 328 is disposed between clutch plate 330 and cover 312 and piston 308. The material can be secured to one or the other of plate 330 and cover 312 and to one or the other of plate 330 and piston 308, respectively. The discussion regarding friction material 120 and clutch plate 122 in the descriptions for FIGS. 2A and 2B is applicable to friction material 328, and clutch plate 330, respectively. Apparatus 300 positions friction material with an advantageously large radius, since the use of rivets on piston 308 in the vicinity of the friction material is eliminated. For example, rivets are not necessary to attach piston 308 to arrangement 304. Also, there is no resilient element and thus no need for rivets to attach a resilient element to the piston.

Figure 7:
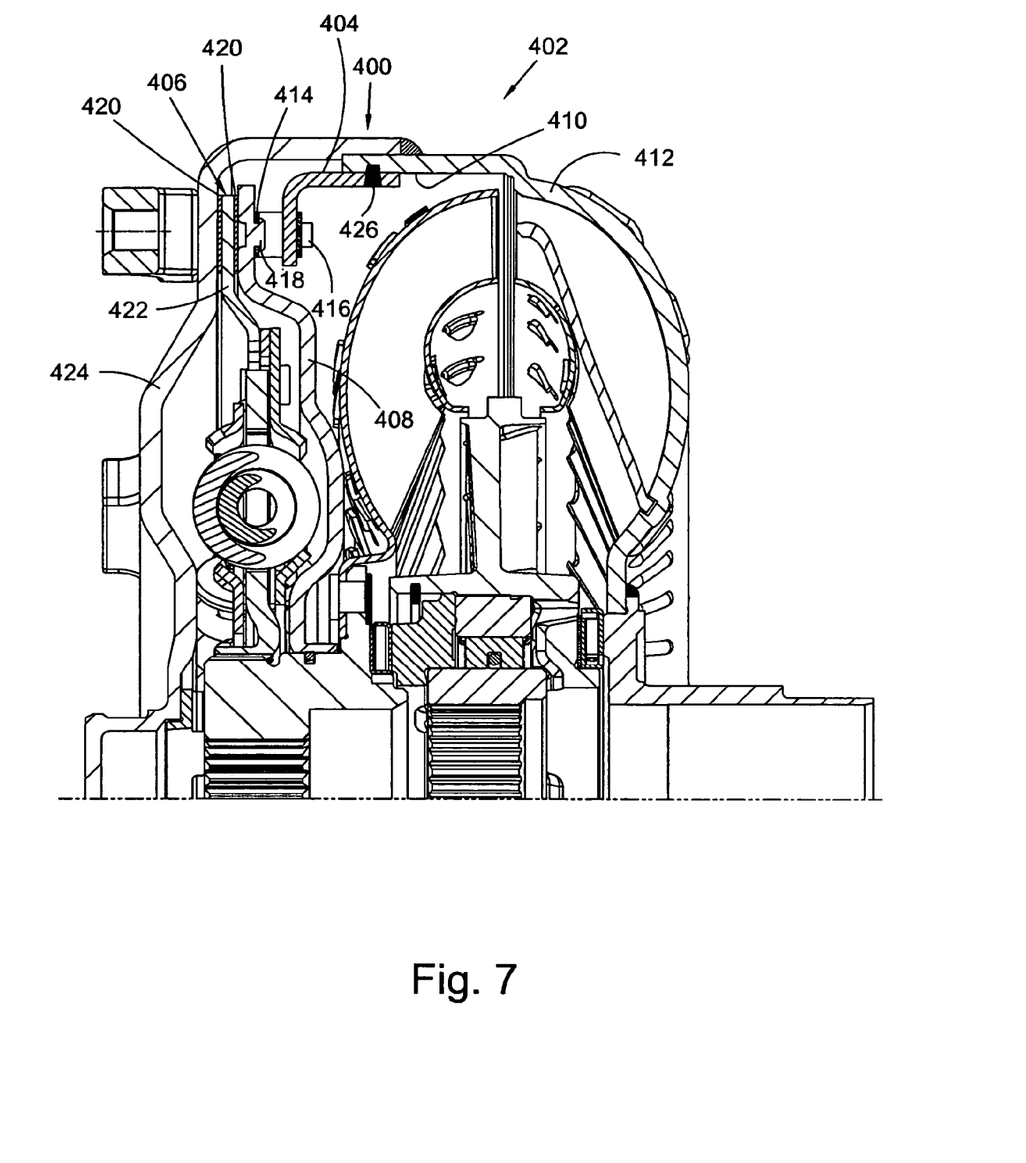
FIG. 7 is a partial cross-sectional view of a fourth present invention torque transfer apparatus for a torque converter.

FIG. 7 is a partial cross-sectional view of present invention torque transfer apparatus 400 for torque converter 402. The following should be viewed in light of FIGS. 1 through 7. Apparatus 400 includes connection element 404 and lock-up clutch 406 with piston plate 408. It should be understood that the present invention is not limited to use with the clutch shown in FIG. 7 and that the present invention can be used with any lock-up clutch for a torque converter known in the art. Element 404 is attached to inner circumferential surface 410 of pump cover 412. Resilient element 414 is disposed between element 404 and piston 408 and is connected to each. In some aspects, element 414 is a leaf spring. However, it should be understood that element 414 can be any applicable resilient element known in the art. In some aspects, rivets 416 connect element 404 to the resilient element and extruded rivets 418 connect piston 408 to the resilient element. The discussion regarding rivets 116 and 118 in the description for FIGS. 2A and 2B is applicable to rivets 416 and 418. Friction material 420 is disposed between clutch plate 422 and cover 424 and piston 408. The material can be secured to one or the other of plate 422 and cover 424 and to one or the other plate 422 and piston 408, respectively. The discussion regarding advantageous configurations for apparatus 100 in the descriptions for FIGS. 2A and 2B is applicable to apparatus 400.

Element 404 can be a single piece extending completely about an inner circumference for cover 412, for example, a ring-shaped piece, or can be a plurality of pieces located at different spots along the inner circumference. For example, portions of a ring-shaped piece. Element 404 can be attached to the cover or inner surface 410 using any means known in the art. For example, weld 426 is used to attach element 404 in FIG. 7. The weld can be continuous or in spots. Any type of welding known in the art can be used.

Figure 8:
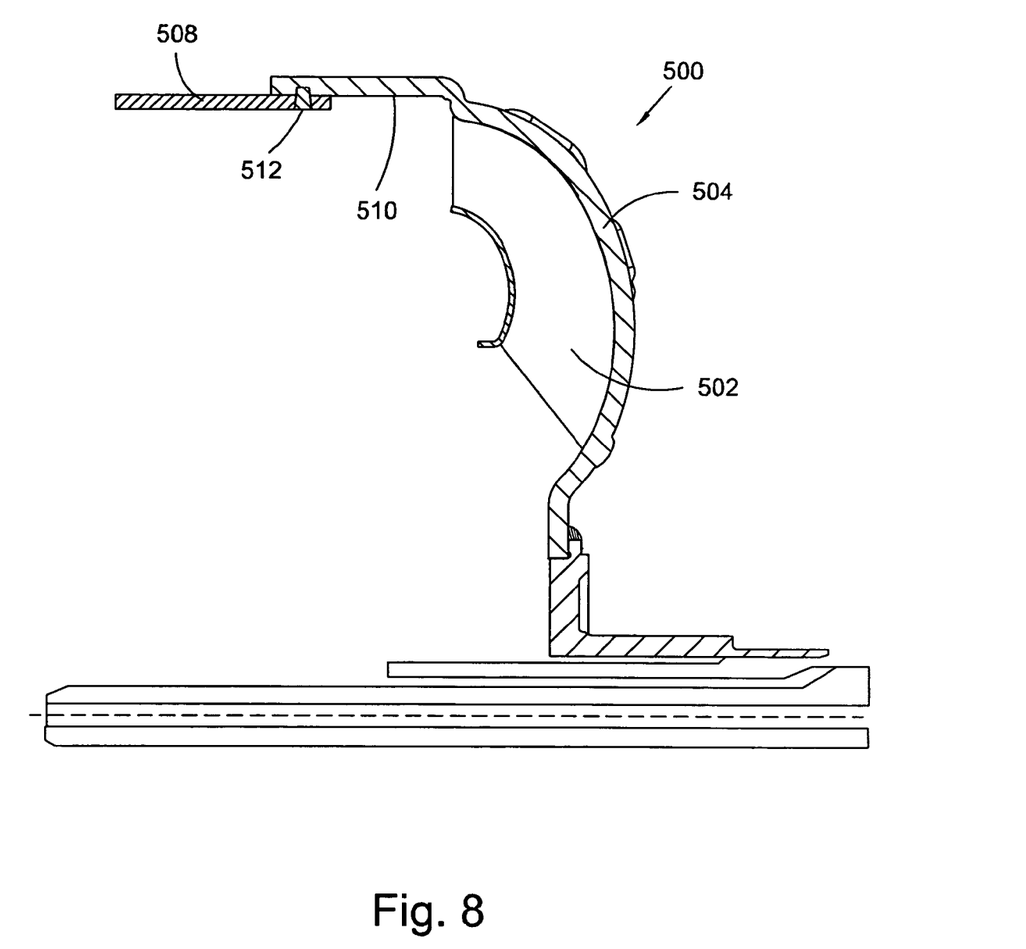
FIGS. 8 through 11 illustrate a present invention method for assembling a torque converter.
Figure 9:
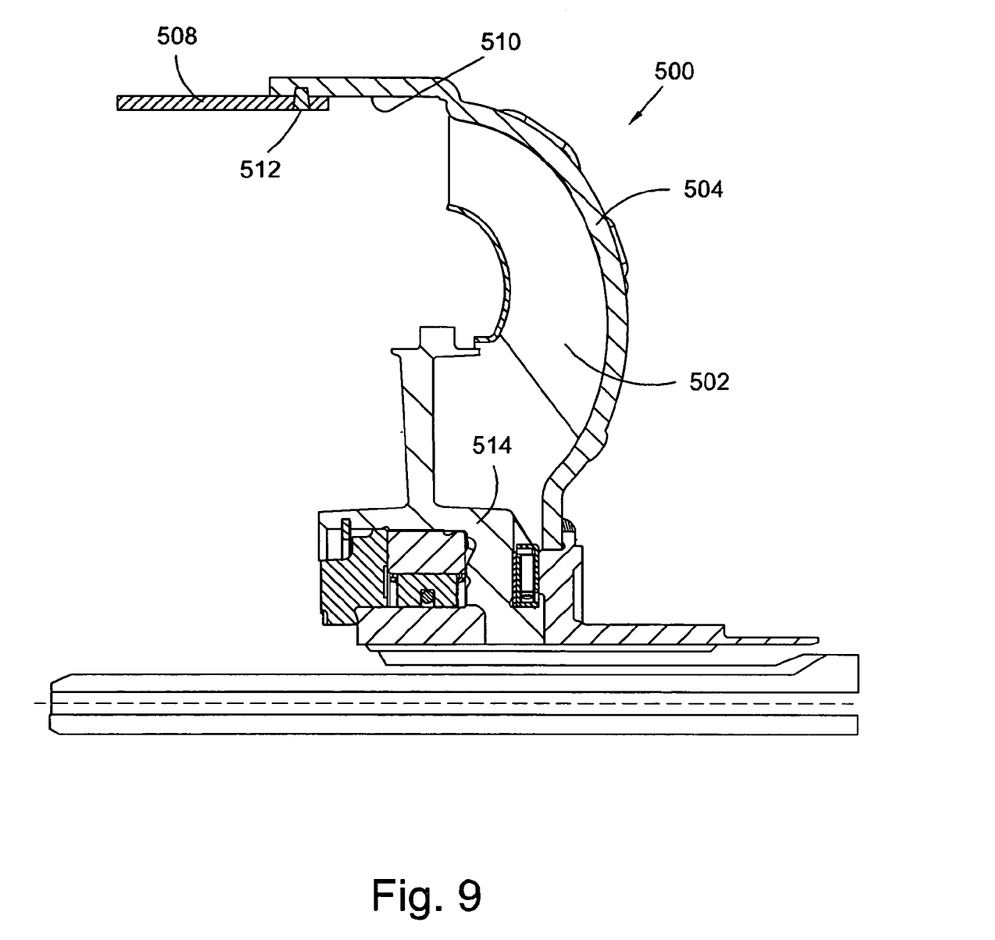
Figure 10:
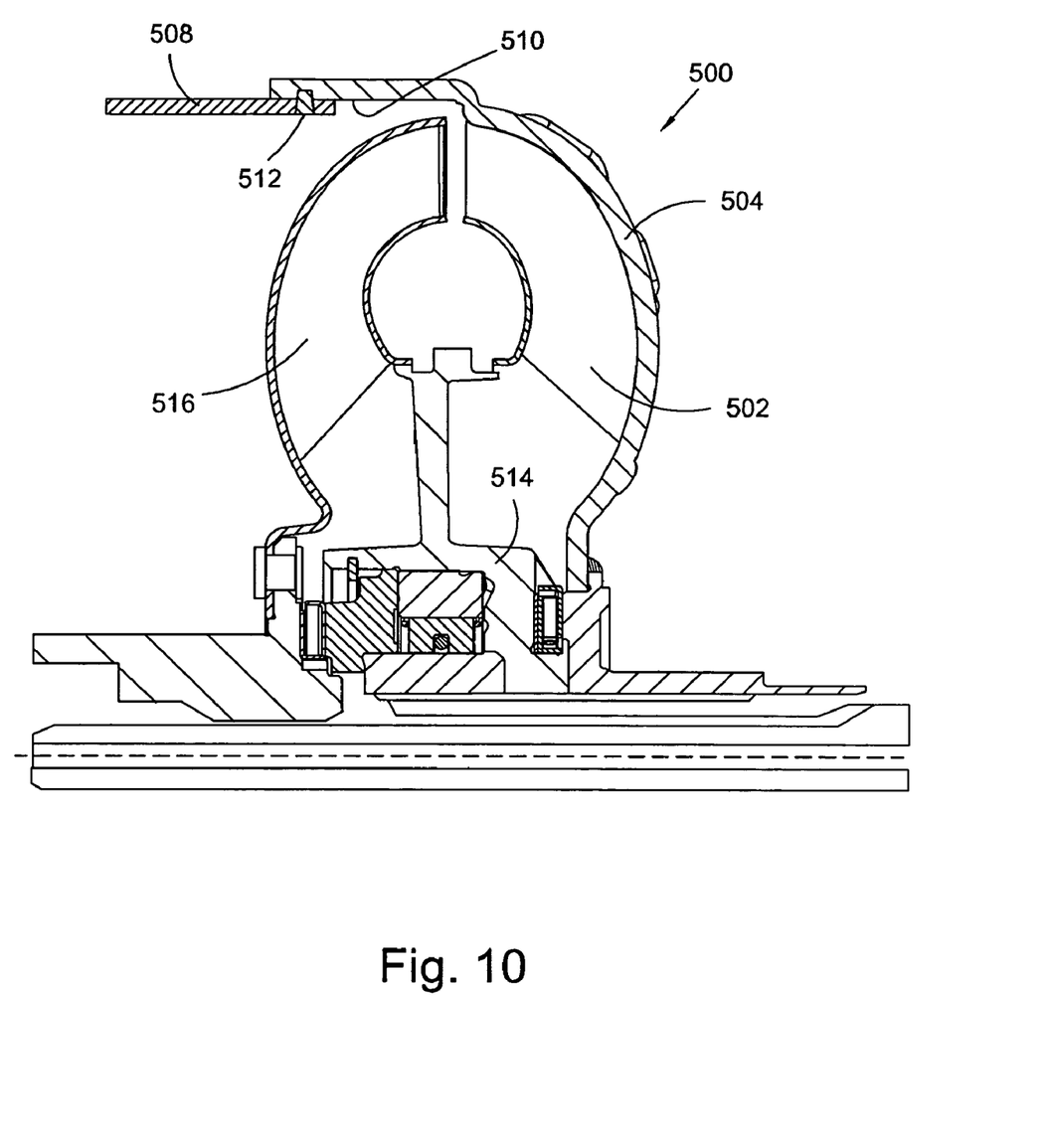
Figure 11:
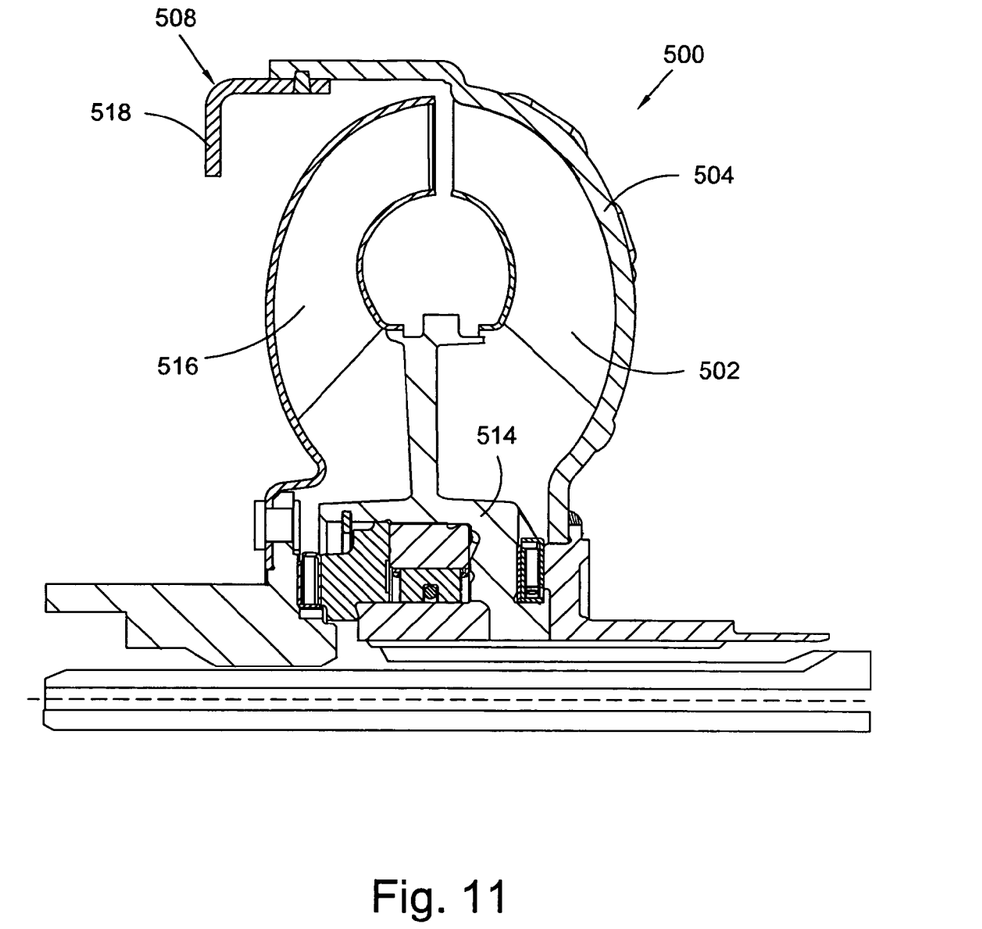

FIGS. 8 through 11 illustrate a present invention method for assembling torque converter 500. In FIG. 8, pump 502 having pump cover 504, is stacked and element 508 is connected to inner radial surface 510 of cover 504. Element 508 can be connected by any means known in the art. In some aspects, element 508 is connected with weld 512. Weld 512 can be intermittent or continuous. Any welding means known in the art can be used. In some aspects, element 508 is similar to element 404 in FIG. 7 or is similar in configuration and function to element 104 in FIG. 2A. However, it should be understood that element 508 is in general, a connection element useful for connecting any applicable component in converter 500. Performing welding in the configuration shown in FIG. 8 is advantageous in that only a portion of the total components of converter 500 are in place. Therefore, there is clearer access to surface 510, weld splatter or other contamination of components can be avoided (i.e., for components are not yet installed in the converter), and converter 500 can be more easily cleaned since fewer components are present. In FIG. 9, reactor 514 is stacked on the pump. In FIG. 10, turbine 516 is stacked on the reactor. In FIG. 11, element 508 is bent to form radial segment 518. In general, segment 518 is the point at which components in the converter at connected to element 508. In some aspects, the method shown in FIGS. 8 through 11 is used to form torque converter 402 shown in FIG. 7.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A torque transfer apparatus for a torque converter, comprising:
    at least one connection element attached to an inner circumferential surface for a cover of said torque converter;
    a lock-up clutch, said lock-up clutch comprising a piston plate with at least one extruded rivet; and,
    at least one resilient element connected to said at least one connection element and said piston plate, wherein said resilient element is connected to said piston plate with said at least one extruded rivet, wherein said torque converter further comprises a longitudinal axis, said lock-up clutch comprises friction material having an inner radius with respect to said axis, said connection element comprises a radial segment extending radially from said inner circumferential surface and with an edge disposed a radial distance from said axis, and said radial distance is greater than said inner radius for said friction material.

2. The torque transfer apparatus recited in claim 1 wherein said torque converter further comprises a longitudinal axis, said lock-up clutch comprises friction material having an inner radius with respect to said axis, said plurality of extruded rivets is disposed at a radial distance from said axis, and said radial distance is greater than said inner radius for said friction material.

3. The torque transfer apparatus recited in claim 2 wherein said friction material comprises an outer radius with respect to said axis and said radial distance is between said inner and outer radii for said friction material.

4. The torque transfer apparatus recited in claim 1 wherein said torque converter further comprises a longitudinal axis, said lock-up clutch comprises friction material having an inner radius and an outer radius with respect to said axis, and said at least one resilient element is disposed between said inner and outer radii for said friction material.

5. The torque transfer apparatus recited in claim 1 wherein said cover is a pump cover.

6. A torque transfer apparatus for a torque converter, comprising:
   at least one connection element; and,
   a piston plate for a lock-up clutch, where said at least one connection element is connected to said piston plate and said at least one connection element is fixedly secured to a cover for said torque converter with a force-fit between said at least one connection element and said cover, wherein said torque converter further comprises a longitudinal axis, said lock-up clutch comprises friction material having an inner radius with respect to said axis, said connection element comprises a radial segment extending radially from said inner circumferential surface and with an edge disposed a radial distance from said axis, and said radial distance is greater than said inner radius for said friction material.

7. The apparatus of claim 6 wherein said cover further comprises an inner circumferential surface and said force fit is between said at least one connection element and said inner circumferential surface.

8. The apparatus of claim 7 wherein said inner circumferential surface and said at least one connection element comprise at least one recess and at least one protrusion and said force-fit comprises said at least one protrusion and said at least one recess.

9. The apparatus of claim 8 wherein said torque converter comprises a longitudinal axis and said at least one recess and said at least one protrusion are circumferentially disposed about said axis.

10. The apparatus of claim 8 wherein said at least one protrusion is formed in said inner circumferential surface and said at least one recess is formed in said connection element.

11. The apparatus of claim 10 wherein said cover is dimpled into said at least one connection element.

12. The apparatus of claim 10 wherein said at least one protrusion extends circumferentially along said inner circumferential surface.

* * * * *